H. BATES.
TYPEWRITING MACHINE.
APPLICATION FILED JUNE 28, 1919.
1,428,832.
Patented Sept. 12, 1922.
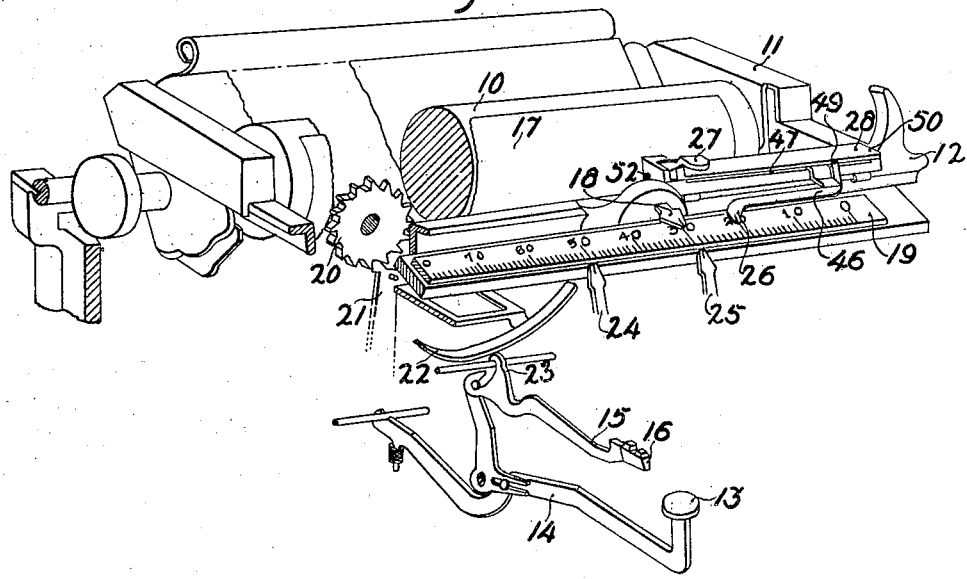
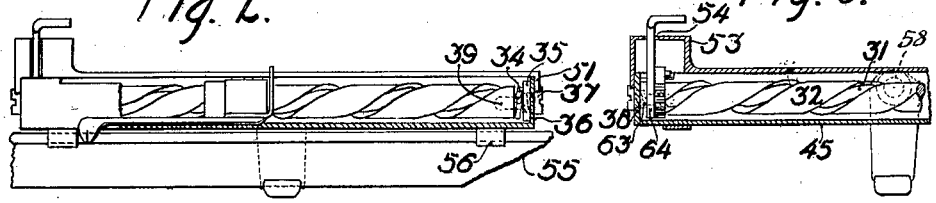
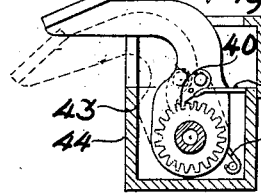
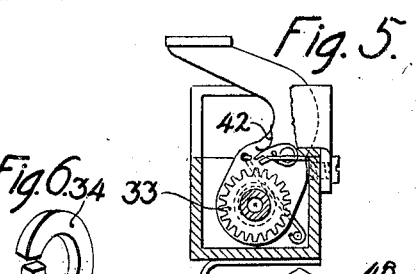
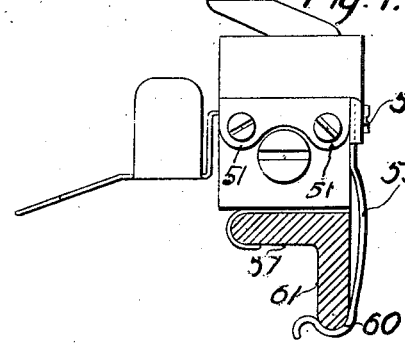
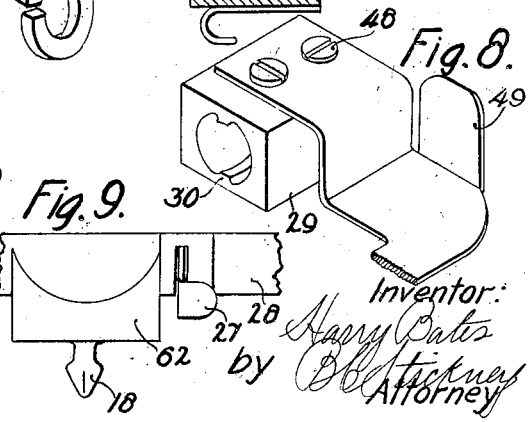
Inventor:
Harry Bates
by B. B. Stickney
Attorney Patented Sept. 12, 1922.

1,428,832

UNITED STATES PATENT OFFICE.

HARRY BATES, OF NEW YORK, N. Y., ASSIGNOR TO UNDERWOOD TYPEWRITER COMPANY, OF NEW YORK, N. Y., A CORPORATION OF DELAWARE.

TYPEWRITING MACHINE.

Application filed June 28, 1919. Serial No. 307,341.

*To all whom it may concern:*

Be it known that I, HARRY BATES, a citizen of the United States, residing in New York city, in the county of New York and State of New York, have invented certain new and useful Improvements in Typewriting Machines, of which the following is a specification.

This invention relates to typewriting machines, and more especially to what are sometimes known as word-centering devices. The invention, as herein described, is applied to an Underwood typewriting machine in which the revoluble platen is journaled in a traveling carriage.

The device is herein illustrated as an improvement on my co-pending application No. 282,891, filed March 15, 1919, which became Patent No. 1,350,000, August 17, 1920. In the structure illustrated in said application, the typewriter carriage is provided with both the usual pointer, which serves to indicate the position of the carriage, and with an extra centering pointer, the latter adapted to be shifted along the carriage by manipulating a lever or counting mechanism. The centering pointer when shifted in this way will indicate upon the usual letter-space scale plate the point at which the writing is to be begun to bring the center of the writing at the point then indicated by the usual scale pointer.

According to the present invention, the centering pointer may be carried by a mounting from which it projects and in which it is adapted to be shifted by means of a screw or thread, said thread being adapted to be turned by means of a finger-piece so as to advance the centering pointer half a letter-space division at a time.

The casing may comprise lugs adapted to fit over some part, such as the horizontal ledge of the front carriage bar, of the Underwood typewriting machine, and to be held in place thereon by means of a catch which engages a rear side of said bar.

Other features and advantages will hereinafter appear.

In the accompanying drawings,

Figure 1 is a fragmentary perspective view, showing the device as applied to an Underwood typewriting machine.

Figure 2 is a fragmentary front view of the carriage bar, showing a pointer casing mounted thereon and largely broken away.

Figure 3 is a somewhat similar view omitting the carriage front bar.

Figure 4 is a sectional side view of the finger-piece just beginning to drive the screw to advance the pointer.

Figure 5 is a similar view, showing the finger-piece in normal position.

Figure 6 is a perspective view of a friction washer for holding the screw.

Figure 7 is a side view partly in section of the parts seen in Figure 2.

Figure 8 is a fragmentary perspective view of the block upon which the pointer is mounted in the casing.

Figure 9 is a fragmentary plan view, showing the pointer casing positioned against the carriage lug.

In the usual Underwood typewriting machine, the revoluble platen 10 is journaled in a frame 11 in the carriage 12, which travels from right to left. Whenever a character-key 13 is depressed it carries down its key-lever 14 to swing its type-bar 15 upwardly and rearwardly, so that the type 16 thereon prints upon a work-sheet 17, passed around the platen. The type prints upon the inserted work-sheet at a point in the travel of the carriage, indicated by the usual carriage pointer 18 upon the usual letter-space scale-plate 19 at the front of the machine frame, and in printing feeds along the carriage by the usual escapement wheel 20, which the actuated type-bar controls by the usual dogs 21, said dogs, in turn, being operated by the universal bar 22, which the usual heel 23 upon the type-bar 15 strikes as it approaches the platen 10.

The machine is also provided with the usual right and left-hand margin stops, which serve to limit the travel of the carriage in either direction, and have attached to them pointers 24, 25, overlying the scale-plate 19.

To center any given line of writing upon the work-sheet 17, so that its center will lie at the point where the usual pointer 18 stands, a centering pointer 26, which normally stands overlying and pointing to the same letter-space upon the scale 19 as the pointer 18, is adapted to be moved by half letter-spaces to the right by actuating a finger-piece 27, with the result that if the finger-piece 27 is actuated as many times as there are letters and spaces in the line to be written, the centering pointer 26 will indicate upon the scale 19 the letter-space at which the writing is to be begun.

The finger-piece 27 is mounted in a casing 28, which contains a counting mechanism. In order to drive the pointer 26, step by step, in half letter-space units, the pointer is mounted upon a block or traveling nut 29 which slides within the casing 28 and which comprises threads 30 to engage between the threads 31 of a screw 32 having a double thread of coarse pitch, preferably approaching a pitch of one turn per five diameters. The screw is adapted to be rotated intermittently by the handle 27 through a ratchet wheel 33 fast to the screw. The screw is normally held against turning accidently by means of a spring washer 34, which is interposed between its end and a bearing surface 35 at the end 36 of the casing. To support the screw, it is journaled upon the ends of screws 37 which are threaded into the ends 36 and 38 of the screw-supporting member or casing and which form journals for sockets 39 in the screw 32 at its journals. There is provided upon the handle or finger-piece 27, a pawl 40 which normally rests upon a shelf 41, but which, upon advance of the handle 27, is carried clear of the shelf 41 and is carried by a light spring 42 into mesh with the ratchet wheel 33 and turns said wheel until a stop 43 forming an extension of the handle arrests the handle by striking against the front wall 44 of the casing 28. In order to prevent the lug or block 29 from turning with the turning of the screw 32, its bottom may lie close upon and be guided by the bottom 45 of the casing 28. When the handle 27 is released it springs back under the influence of a spring 45ª, which is anchored in the end of the casing, but the screw 32, being detained by its washer 34, fails to turn with the returning of the handle.

In order to enable the pointer 26 to engage the screw 32 at a convenient place, the pointer is provided with a long stretch 46 extending to the right and then turns backwardly and inwardly through a slot 47, so that it may be held by screws 48 upon the block 29. To enable the pointer to be easily shifted, as when returning to starting position, a turned-up end of the stretch 46 forms a finger-piece 49 for shifting it.

To make a light but rigid structure, the body of the casing 28 may be drawn from a single piece of metal or may be built up by soldering or brazing, and the only loose piece may be the top 50 which has dependent ears 51 at its ends through which the screws 52 are adapted to be passed, entering openings in the ends 36 and 38 of the casing. To accommodate the pawl 40 and yet keep the rest of the casing small, the left-hand end of the top may be formed as an enlarged hood 53 having an opening 54 in which the handle 27 moves backward and forward.

To enable the casing 28 to be readily attached to the usual front bar 55 of the typewriter carriage, it may be provided with hook-shaped lugs 56 upon its bottom adapted to fit closely and engage the rib 57 projecting frontwardly from the bar 55. There may be pivotally attached, by means of a screw 58 to the back of the casing, a resilient arm 59, having a lug end 60 adapted to engage in the vertical rib 61 of the front bar 55 and hold the casing in place. If the teeth of the ratchet wheel 33 are properly set the pointer 26 may be positioned accurately by merely placing the casing 28 against the usual lug 62 at the front bar 55, and then pushing the pointer 26 to the left to its starting point. For convenience of construction, the left-hand screw 37 may be provided with a shoulder 63 against which the body 64 of the handle 27 bears, the handle being thus journaled upon the left-hand screw 37 and therefore revolving concentrically with the screw 32 and the ratchet wheel 33.

Variations, including rearrangement and reversals of parts, may be resorted to within the scope of the invention, and portions of the improvements may be used without others.

Having thus described my invention, I claim:

1. In a typewriting machine, the combination with a travelling carriage and a revoluble platen therein, of a letter-space scale, a slide upon the carriage, a block upon the slide, a pointer upon the block, a screw engaging the block and adapted to drive it, a ratchet wheel fast to the screw, a pawl for the ratchet wheel, and a finger-piece for driving the pawl.

2. In a typewriting machine, the combination with a travelling carriage and a revoluble platen therein, of a letter-space scale, a slide upon the carriage, a block upon the slide, a pointer upon the block, a screw engaging the block and adapted to drive it, a ratchet wheel fast to the screw, a pawl for the ratchet wheel, a finger-piece for driving the pawl in half letter-space intervals, and a device normally holding the pawl ineffective.

3. In a typewriting machine, the combination with a traveling carriage and a revoluble platen therein, of a letter-space scale, a slide upon the carriage, a block upon the slide, a pointer upon the block, a screw engaging the block and adapted to drive it, a ratchet wheel fast to the screw, a pawl for the ratchet wheel, a finger-piece journaled upon the axis of the screw and carrying the pawl, and a device for retaining the pointer in its set position.

4. In a typewriting machine, the combination with a traveling carriage and a revoluble platen therein, of a letter-space scale, a screw upon the carriage, a pointer, a mounting for the pointer slidable upon the carriage and engaging the screw to be driven by it, a ratchet wheel connected to the screw, a pawl for driving said ratchet wheel to move the pointer half letter-space units, means for detaining the pointer where set, and a casing in which said screw is journaled and detachably mounted upon the carriage.

5. In a typewriting machine having a frame part, a letter-feeding carriage part to travel thereon and a letter-space scale on one of said parts, the combination of a line-centering device comprising a screw mounted to rotate on one of said parts in substantially parallel relation to said scale, a traveling nut on the screw, a guide to prevent rotation of the nut, a pointer carried by the nut to co-operate with the scale, a ratchet-wheel fast to the screw, a pawl for imparting step-by-step movement to the ratchet-wheel, and a finger-piece for operating the pawl.

6. In a typewriting machine having a frame part, a letter-feeding carriage part to travel thereon and a letter-space scale on one of said parts, the combination of a line-centering device comprising a screw mounted to rotate on one of said parts in substantially parallel relation to said scale, a traveling nut on the screw, a guide to prevent rotation of the nut, a pointer carried by the nut to co-operate with the scale, a ratchet-wheel fast to the screw, a pawl for imparting step-by-step movement to the ratchet-wheel, a finger-piece for operating the pawl, and means for normally holding the pawl ineffective.

7. In a typewriting machine having a frame part, a letter-feeding carriage part to travel thereon and a letter-space scale on one of said parts, the combination of a line-centering device comprising a screw mounted to rotate on one of said parts in substantially parallel relation to said scale, a traveling nut on the screw, a guide to prevent rotation of the nut, a pointer carried by the nut to co-operate with the scale, a ratchet-wheel fast to the screw, a pawl for imparting step-by-step movement to the ratchet-wheel, a finger-piece pivoted coaxially of the screw and carrying the pawl, and a device for retaining the pointer in its set position.

8. In a typewriting machine having a frame part, a letter-feeding carriage part to travel thereon and a letter-space scale on one of said parts, the combination of a line-centering device comprising a screw mounted to rotate on one of said parts in substantially parallel relation to said scale, a traveling nut on the screw, guiding means to prevent rotation of the nut, a pointer carried by the nut to co-operate with the scale, a ratchet-wheel fast to the screw, a pawl for imparting step-by-step movement to the ratchet-wheel, a finger-piece for operating the pawl, means for normally holding the pawl ineffective, said screw being of a pitch to drive said nut or to be driven thereby, and a friction device for yieldingly holding the screw against rotation so as to retain the pointer where set while permitting the screw to rotate independently of the ratchet-wheel to enable the pointer-carrying nut to be pushed back to starting position when the pawl is ineffective.

9. In a typewriting machine having a frame part, a letter-feeding carriage part to travel thereon and a letter-space scale on one of said parts, the combination of a line-centering device comprising a screw-supporting member mounted on one of said parts and having ends, a screw journaled at its ends on the ends of said member in substantially parallel relation to said scale, a traveling nut on the screw, said member forming guiding means to prevent rotation of the nut, a pointer carried by the nut to co-operate with the scale, a ratchet-wheel fast to one end of the screw, a finger-piece pivoted coaxially of the screw adjacent to the ratchet-wheel, a pawl carried by the finger-piece and engageable with the ratchet-wheel for imparting step-by-step rotation thereto, means for normally holding the pawl at ineffective position out of engagement with the ratchet-wheel, said screw being of a pitch to drive said nut or to be driven thereby, and a spring interposed between one end of the screw and the adjacent end of said member for frictionally yieldingly holding the screw against rotation so as to retain the pointer where set and to permit the screw to rotate independently of the ratchet-wheel to enable the pointer-carrying nut to be pushed back to starting position when the pawl is ineffective.

HARRY BATES.

Witnesses:
 EDITH B. LIBBEY,
 CATHERINE A. NEWELL.